US012802586B2

(12) United States Patent
Warne et al.

(10) Patent No.: US 12,802,586 B2
(45) Date of Patent: Nov. 17, 2026

(54) MOTION GENERATOR

(71) Applicant: Dynisma Ltd., Bristol (GB)

(72) Inventors: Ashley William Hawker Warne, Bristol (GB); Daniel Charmbury Ward, Bristol (GB); James Golding, Bristol (GB)

(73) Assignee: Dynisma Ltd., Bristol (GB)

( * ) Notice: Subject to any disclaimer, the term of this patent is extended or adjusted under 35 U.S.C. 154(b) by 168 days.

(21) Appl. No.: 18/692,375

(22) PCT Filed: Oct. 5, 2022

(86) PCT No.: PCT/EP2022/025458

§ 371 (c)(1),
(2) Date: Mar. 15, 2024

(87) PCT Pub. No.: WO2023/057086

PCT Pub. Date: Apr. 13, 2023

(65) Prior Publication Data

US 2024/0379021 A1 Nov. 14, 2024

(30) Foreign Application Priority Data

Oct. 6, 2021 (GB) ...................................... 2114324
May 20, 2022 (EP) ..................................... 22020231

(51) Int. Cl.
*G09B 9/12* (2006.01)
*G09B 9/04* (2006.01)

(52) U.S. Cl.
CPC ..................................... *G09B 9/12* (2013.01); *G09B 9/04* (2013.01)

(58) Field of Classification Search
CPC .................................... G09B 9/12; G09B 9/04
See application file for complete search history.

(56) References Cited

U.S. PATENT DOCUMENTS 5,919,045 A 7/1999 Tagge et al.
6,634,885 B2 * 10/2003 Hodgetts .................. G09B 9/12 434/30

(Continued)

FOREIGN PATENT DOCUMENTS

CN 101454831 A 6/2009
CN 105939765 A 9/2016

(Continued)

OTHER PUBLICATIONS

International Search report and Written Opinion for Patent Cooperation Treaty Application No. PCT/EP2022/025458, dated Feb. 13, 2023, (3 pages).

(Continued)

*Primary Examiner* — James S. McClellan
(74) *Attorney, Agent, or Firm* — Nath, Goldberg & Meyer; Joshua B. Goldberg

(57) ABSTRACT

A motion generator is disclosed for applying forces, moments and movements to an effector of the motion generator and/or effector payload relative to a surface, in which the effector is operably connected to free ends of rocker arm(s) provided by one or more rockers, each rocker pivoting about a pivot axis, such that the movement of the rocker(s) about the respective pivot axis leads to movement of the effector, in which at least one rocker is driven by an associated curved linear motor concentric with an arc swept by a free end of the associated rocker, and in which at least one rocker carries, comprises or includes a coil, or a magnet way of the associated curved linear motor. Also disclosed are motion systems, and motion simulators including such motion generators especially for use in driving simulation applications.

19 Claims, 13 Drawing Sheets

(56) References Cited

U.S. PATENT DOCUMENTS

| | | | | |
|---|---|---|---|---|
| 2005/0277092 | A1 | 12/2005 | Hwang | |
| 2012/0180593 | A1 | 7/2012 | Alet et al. | |
| 2012/0206081 | A1* | 8/2012 | Sun | H02K 41/031 310/38 |
| 2013/0018374 | A1* | 1/2013 | Edelhauser | A61B 17/62 606/56 |
| 2014/0157916 | A1 | 6/2014 | Vatcher et al. | |
| 2014/0239610 | A1* | 8/2014 | Lasher, III | B62K 25/04 280/276 |
| 2014/0302462 | A1* | 10/2014 | Vatcher | G09B 9/12 434/55 |
| 2015/0178017 | A1 | 6/2015 | Darrington et al. | |
| 2016/0379512 | A1* | 12/2016 | Kirkman | G09B 9/06 434/34 |
| 2017/0053548 | A1 | 2/2017 | Warne | |
| 2018/0028924 | A1* | 2/2018 | Sawade | B60B 19/14 |
| 2018/0096622 | A1* | 4/2018 | Glover | G09B 9/048 |
| 2019/0069856 | A1* | 3/2019 | Achkire | A61B 6/107 |
| 2019/0303024 | A1 | 10/2019 | Iwai et al. | |
| 2019/0389054 | A1* | 12/2019 | Zhao | B25J 9/0009 |
| 2021/0158719 | A1* | 5/2021 | Warne | G09B 9/08 |

FOREIGN PATENT DOCUMENTS

| | | | |
|---|---|---|---|
| EP | 2486558 | A2 | 8/2012 |
| EP | 2810268 | A1 | 12/2014 |
| EP | 3731213 | A1 | 10/2020 |
| EP | 3739558 | A1 | 11/2020 |
| EP | 3751543 | A1 | 12/2020 |
| WO | WO 2020/228992 | A1 | 11/2020 |

OTHER PUBLICATIONS

European Search Report and Written Opinion for European Application No. 22202311, dated Apr. 12, 2023, (7 pages), European Patent Office.

Lucas, G. et al., "Study of Latency Gap Corrections in a Dynamic Driving Simulator", Driving Simulation Conference & Exhibition, France, Sep. 4, 2019, (3 pages).

"Basic Specification", NVM Express, Mar. 9, 2020, (405 pages), https://nvmexpress.org/wp-content/uploads/NVM-Express-1_4a-2020.03.09-Ratified.pdf.

Notification of the First Office Action dated May 21, 2026 corresponding to application No. 202280075838.X.

* cited by examiner

MOTION GENERATOR

CROSS REFERENCE TO RELATED APPLICATIONS

This application is a National Stage Application, filed under 35 U.S.C. § 371, of International Application No. PCT/EP2022/025458, filed Oct. 5, 2022, which international application claims priority to and the benefit of European Application No. 22020231.1, filed May 20, 2022 and, United Kingdom Application No. 2114324.3, filed Oct. 6, 2021; the contents of all of which as are hereby incorporated by reference in their respective entireties.

BACKGROUND

Related Field

This invention relates to the field of motion systems especially motion systems for simulating motion such as driving or flying. In particular, though not exclusively, the invention relates to motion generators, and to motion systems including such motion generators, and to methods of using motion generators or motion systems especially for use as driving simulators, and to methods for their production.

Description of Related Art

A motion generator is a device capable of applying movements, forces, and accelerations to an effector or an effector payload in one or more directions or degrees of freedom. The effector is part of the motion generator. The effector payload can be, for example, a human undergoing a simulated motion experience in a motion simulator incorporating a motion generator. Alternatively, the payload may be a further motion generator which is said to be in series with the first motion generator and provides additional or alternative motion for the effector, or effector payload to that provided by the first motion generator. Motion generators are used in motion systems. Motion systems, in the context of this invention, comprise a motion generator and include a control system for controlling the motion generator. The most common type of motion generator currently used in motion simulation is the Stewart platform (or "hexapod") motion generator. This is a type of parallel manipulator that has six actuators, normally attached in pairs to three positions on the base of the manipulator and crossing over to three mounting points on a platform, or top plate (i.e., the "end effector"). Devices or payloads such as a human user placed on the platform, usually in some form of cockpit, driver area, or model vehicle, can be moved in the six degrees of freedom in which it is possible for a freely suspended body to move, i.e., the three linear directions of movement X, Y, Z (lateral, longitudinal and vertical), and the three rotations (pitch, roll and yaw). Generally speaking, in a parallel manipulator-based motion system, several computer-controlled actuators are arranged to operate in parallel to support the payload. In this context "parallel" means that only one actuator exists in each separate load path between the payload and the base, whereas, in a series manipulator, one or more of the possible load paths between the payload and the base includes at least two actuators.

Motion simulators including motion systems are used in a variety of applications, including motion simulation (for example, flight simulators for fixed and rotary wing aircraft, vehicle and driving simulators), vibration, and seismic simulation.

A motion simulator is a simulation system incorporating at least one motion generator/motion system that can create, for an occupant, the effects or feelings of being in a moving vehicle or aircraft. Motion simulators are used professionally for training drivers and pilots in the form of driving simulators and flight simulators, respectively. They also are used industrially in the creation, design, and testing of the vehicles themselves, as well as in the design of vehicle components. Professional motion simulators used for driving and flying simulation typically synchronise a visual display—provided, for example, by a projection system and associated screens and audio signals—with the movement of a carriage (or chassis) occupied by the driver or pilot to provide a better sensation of the effect of moving. The advent of virtual reality (VR) head-mounted displays (HMDs) makes the aspect of an immersive simulation less costly with current motion systems and has the ability to deliver virtual reality applications to leisure uses such as in passive amusement park or arcade driving, riding-first-person, or flying rides and in active gaming, where one or more players has some control over the driving, riding, flying or first-person game experience. The payload of a motion generator used in motion simulation—for example, a chassis or cockpit—is relatively heavy often being of the order of 100's of kg, although smaller payloads are possible in certain applications such as gaming (e.g., motorsport gaming simulation applications). Motion simulation applications for motion generators require the precise control of such relatively heavy payloads over significant movements (or "excursions"), often being of the order of 1 metre or more.

The type of hexapods typically used for motion simulation for human participants conventionally have a relatively low bandwidth of up to about 20 Hz. This means that they can create oscillatory movements and vibrations of a consistent amplitude, with a frequency of up to 20 times per second, beyond which the amplitude of the movements reduces as the frequency increases. In simulating automotive vehicle motion, this may be sufficient for replicating most car suspension movements, but it does not transmit the higher frequency content such as that associated with vibrations from the car engine, tyre vibrations, road noise, and the sharp-edged kerbs on racetracks. A low bandwidth also means the signals are delayed, meaning that the driver cannot respond as quickly.

Current motion systems, especially those intended for high-end use such as in vehicle, military and commercial flight instruction and training applications, are typically very large, heavy, complex, and very expensive. Their complexity necessitates extensive programming and maintenance, further increasing the cost to users.

Dedicated driving simulator motion systems have been developed by the likes of McLaren/MTS Williams/ABD and Ansible, but these tend to be extremely mechanically complex, and therefore expensive, featuring precision machined custom components and often expensive custom linear motors. These dedicated driving simulator motion systems are more responsive than hexapods when moving in some directions but are still limited in other directions. The common usage of ball screws in such systems is disadvantageous in that, whilst good at establishing position, the ball screws inhibit force transfer and can only achieve a lower bandwidth. These issues result in a significantly less natural motion simulation experience for a human user. For example, they lead to poor latency which requires additional correction measures to minimise motion sickness (see e.g., Lucas, G et al.—Study of latency gap corrections in a dynamic driving simulator—In: Driving Simulation Conference & Exhibition, France, 2019-09-04—DSC 2019 EUROPE VR—2019).

The motion simulator disclosed in EP2486558 comprises a mechanism that uses a three degree of freedom parallel manipulator comprising three upright arms driven by bell cranks to control movement in pitch, heave, and roll, and therefore is responsive and has high bandwidth in those degrees of freedom. A rotary table driven in rotation by a linear actuator is required to provide yaw. The motion simulator is intended to be relatively compact. However, its movements in horizontal degrees of freedom are provided by series manipulators which introduce compliance, inertia, and friction which limits the responsiveness and bandwidth of the system in the horizontal degrees of freedom.

U.S. Pat. No. 5,919,045 discloses an interactive racing car simulator, including a primary motion generator comprising a simple series arrangement of overlaying rectangular frames arranged to move in the X and Y directions respectively on linear guides under pneumatic control and termed the "X and Y frames". Whilst the simple arrangement of X and Y frames of the type disclosed in this document provides good excursions in the X and Y directions, as the frames are stacked above each other, the series motion generator is not especially compact in the vertical dimension. Furthermore, the movements in the X and Y directions are not especially precise, and also the simulator would have a relatively low bandwidth.

An example of a primary motion generator in a combination with another motion generator for use in a driving simulator is given in EP2810268A which discloses a three degree of freedom primary motion generator arranged in series with a six degrees of freedom secondary motion generator which can sustain large movements in the horizontal plane using the primary motion generator, while simultaneously achieving the maximum vertical travel of the secondary motion generator. Therefore, the two motion generators working in series can achieve combinations of movements in different degrees of freedom which are impossible with a similarly sized one hexapod arrangement. However, the hexapod described in this document uses linear actuators, specifically recirculating ball screw-driven linear actuators. As noted above, recirculating ball screw actuators have considerable friction, and so lead to poor responsiveness and bandwidth. The use of other linear actuators in a hexapod architecture leads to further problems. In the case that the linear actuator is mobile as part of the moving strut then it has high moving mass which leads to mechanical resonance at low frequencies, limiting system responsiveness and bandwidth. Alternatively, in the case that the linear actuator is fixed relative to a base, and one end of the hexapod strut translates along the linear actuator, then the weight and inertial loads of the system are reacted by a linear bearing which again involves considerable friction. US2017/0053548A discloses a motion system including a cable/actuator-controlled platform which is slidable on a large low friction fixed base, and which allows for significant horizontal movement of the platform. The cables and actuators are disposed around the periphery of the large base, allowing the significant horizontal movement of the platform in this design. A hexapod-based secondary motion generator is in turn mounted on the platform and supports a model vehicle cockpit in order to provide further movement of the cockpit. The motion system is not compact for the excursion levels provided by the large low friction fixed base design. US2012/0180593 discloses a hexapod-based system for use in flight simulators or driving simulators (but principally for flight simulation) in which each leg moves along a linear guide, and in some embodiments the legs are powered by a linear motor. These linear guides are heavy and involve significant friction which is especially disadvantageous in driving simulation applications where responsiveness is especially important. US2014/157916 discloses a motion simulation system including a series of actuators each having a planetary gearbox driven by an associated servomotor which engages with a crank. This direct drive system is a high friction and high latency arrangement intended for use in applications such as amusement parks (see FIG. 17A to 17G). Although no data are provided, the arrangement of US2014/157916 would be expected to have a relatively low bandwidth and high latency. As such it would not be suitable for driving simulation or games apparatus in which high bandwidth and low latency are desirable.

Applicant's patent publication WO2020/228992 (EP20020225) discloses a rocker-based motion generator in which the rockers are driven by an actuator in the form of an elongate belt, cable, rope drive, or linear motor. The motion generator provides high bandwidth motion with low latency. US2005/0277092 and applicant's EP3751543 and EP3731213 are of relevance to the technological background of the invention disclosing other motion generators and motion simulation systems.

An object of the present invention is to provide an improved motion generator, especially one which is useful for driving and vehicle motion-type simulation applications, and improved motion systems incorporating such motion generators, which are, again, especially suitable for those applications.

BRIEF SUMMARY

According to a first aspect of the invention there is provided a motion generator comprising an effector, the motion generator mechanism being arranged to apply forces, moments and movements to the effector of the motion generator and/or effector payload relative to a surface, in which the effector is operably connected to free ends of rocker arms provided by a plurality of rockers, each rocker pivoting about a pivot axis, such that the movement of the rockers about the respective pivot axes leads to movement of the effector, in which at least one rocker is driven by a curved linear motor concentric with an arc swept by the free end of the associated rocker, and in which at least one rocker carries, comprises, or includes a coil or magnet way of an associated curved linear motor. The free end of the rocker may sweep an arc having a radius of the length from the free end of the rocker to the rocker pivot axis. The associated curved linear motor may be concentric with that arc.

The term "curved" which is used in this context in relation to a linear motor and components thereof embraces a linear motor which is generally curved, curvilinear, arc-shaped, or polygonal or facetted (as many "curved" linear motors are in terms of the arrangements of short straight electromagnets along their length) but does not extend to form a complete circle. Typically, the curved linear motor extends about 90 degrees of arc or less.

In motion generators according to the invention, the combination of a rocker and curved linear motor form an axial flux electric machine whereby the coil (or "forcer", or "windings") for an ironless curved linear motor form only part, or an arc, of a complete circle thereby facilitating a direct drive mechanism. This combination significantly improves responsiveness, reduces friction and inertia, compared to known motion generators, by placing the coil at a large radius on the rocker, and typically close to the actuation path to the end effector. This minimises any bending moments in the rocker which could introduce compliance and hamper responsiveness, while allowing a large rocker radius to maximise excursion which is highly desirable in motion simulation applications, especially driving simulation applications.

It has been found that such a motion generator in accordance with the invention provides excellent levels of bandwidth and positional control, with low latency.

Preferably, the rocker comprises or includes the coil, rather than the magnet way of the associated curved linear motor as this reduces the rocker's inertia. Alternatively, if the rocker comprises or includes the magnet way, then this arrangement may involve simpler cable management. The coil may be integrated into the rocker construction.

The curved linear motor may be an ironless or iron core linear motor. In practice, a plurality of curved linear motors may be associated with each rocker, such a combination of linear motors still being referred to herein as a linear motor. Preferably the curved linear motor is an ironless motor, which does not exhibit cogging, an undesirable position-dependent torque disturbance caused by the iron-core in the presence of the magnets. An example of a curved linear motor is an Akribis ironless ACR series motor such as an ACR820-5S or ACR335-58. Other curvilinear motors from manufacturers such as Aerotech or PBA Systems may be suitable.

In this context, a rocker conventionally means a solid body (which may also be referred to as a rocker arm) being attached to one end of an elongate revolute joint, or pivot, such as a shaft moving in a bearing, the free end of the body being able to pivot or sweep about a pivot axis provided by this joint, or pivot, thereby rotating relative to another solid body attached to the other end of the joint, or pivot. The rocker will typically also have other joints and pickup points on its body, typically at the free end, attached to other moving elements. Rockers are typically used in mechanical systems to control relative motions of moving elements, controlling mechanical advantages, and to change directions of motion. Mechanical elements such as bell cranks and levers are forms of rockers. Rockers are often used, for example, in car suspension e.g., in pushrod or pull-rod suspension arrangements. The term "rocker" also embraces for the purposes of this disclosure, a solid body attached to or integral with a flexure, such that the free end of the body is able to describe an arc about an imaginary axis at a midpoint on the flexure, that imaginary axis being equivalent to a pivot axis as referred to above for other rockers. In a preferred embodiment a rocker pivots on a shaft rotating in a bearing, the bearing being arranged above the associated motor components. As noted below, a rocker is preferably symmetrical about its mid-plane.

The rocker, especially the rocker body or rocker arm may be made of composite material or metal, preferably aluminium, construction. A lightweight rocker construction is preferred as it increases responsiveness of the motion generator. For example, the rocker may be a perforated "tea bag" shape (comprising two pairs of opposed substantially triangular faces, in which adjacent triangular faces are inverted with respect to each other) and in which the rocker pivot shaft is housed along a lower linear edge of the "tea bag" whilst the upper outer edge and adjacent surface is formed in an arc shape in a plane perpendicular to the pivot axis and provides a mounting seat for the circular linear motor coil. In preferred embodiments, the motor components are below the pivot axis of an associated rocker. In this case the rocker may have a "swing boat" form.

Thus, the invention provides a motion generator which is in the form of a parallel manipulator with one, two, three, four, five or preferably six degrees of freedom comprising two, or more, typically six, curved linear motors each capable of producing responsive and high bandwidth movements. In a motion generator according to the invention, the effector (e.g., platform or chassis) may typically be connected to four or more elongate rigid struts, more typically six such struts.

Advantageously, the rockers are symmetrical so that they are not handed. For example, a rocker may be symmetrical about its mid-plane. Accordingly, one rocker is immediately replaceable with a further such rocker saving on spare part costs.

A motion generator in accordance with the invention may be advantageous in some or all of several respects compared with known motion generators. The motion generators of this invention are therefore able to provide responsive and high bandwidth motion in all six degrees of freedom. In particular, the motion generator is able to achieve very accurate positioning and low latency.

The first and second joints in a motion generator of the invention, i.e., the upper and lower joints may together have a total number of degrees of freedom which is at least five. Preferably, one of the first or second joints may include a universal, Cardan, spherical joint, or flexure, while the other may be, for example, a spherical joint. Offsetting the two axes of rotation of a Cardan joint is particularly preferred as this arrangement permits the joint to be stiffer in axial motion even when compared to conventional Cardan joints where the axis of rotation intersect.

A motion generator in accordance with the invention typically comprises a plurality of rocker units. In most arrangements, the motion generator may comprise six rockers. At least one rocker unit may be mounted on or to the surface. Alternatively, or additionally, at least one rocker may be mounted on a frame, base, or other support fixed to the surface. A rocker arranged to pivot above an associated motor is preferred.

The pivot axis of at least one, preferably each, rocker is fixed generally parallel relative to the surface where the surface is a physical surface on which the motion generator is installed i.e., the pivot axis is in a horizontal plane. Alternatively, (typically in the context of a combination including a motion generator in accordance with the invention mounted as a secondary motion generator on a primary motion generator), the pivot axis of the rocker may not be fixed relative to that surface but is fixed generally parallel relative to a plane above the physical surface, that plane moving with the primary motion generator. The rocker pivot is preferably a revolute joint, an axle shaft with bearings, or a flexure. Low friction rotary bearings are especially preferred. In another embodiment each rocker may rotate in a plane which is perpendicular to the surface.

A motion generator according to the invention may typically comprise 4, 5, 6 or more elongate struts, but motion generators comprising 1-3 struts are also contemplated. For example, the motion generator may comprise X elongate struts, where X is less than six, and at least one mechanical constraint means which constrains Y degrees of freedom of the effector where Y=6−X. Alternatively there could be more than 6 elongate struts. Pairs of elongate struts may be arranged on opposing sides of the end effector. In one typical embodiment, a motion generator comprises three such pairs of elongate struts.

The motion generator may include brakes to retard the motion of the rockers. Various forms of brakes are contemplated for this application, such as disc brakes, regenerative brakes, and linear brakes. Regenerative braking, also called Safe Dynamic Braking, can be achieved by using the existing curved-linear motors to convert kinetic energy into heat energy in the motor coil. Typically, regenerative braking torque is proportional to the speed of the motor. A combination of regenerative and disc brakes may be preferred in a motion generator.

The payload supported by the effector may be more than 10 kg, preferably more than 80 kg, preferably more than 250 kg, or even more than 500 kg for vehicle motion simulation applications. Typically, in motion simulation applications, the payload may be a vehicle chassis or cockpit or a model thereof.

A motion generator according to the invention may, in another aspect of the invention, be arranged to operate as a secondary motion generator in series with a primary motion generator. Such a combination arrangement comprising a primary and secondary motion generator may provide a user with a greater range of motion for an effector/effector payload. For example, by use of a suitable primary motion generator, a combination of motion generators may achieve excursions of the order of 1 metre or more as required in motion simulation, especially vehicle motion simulation, applications. Furthermore, such a combination arrangement may permit the use of a relatively simple, and therefore cost-effective, primary motion generator providing motion for example in the X and Y directions only with a secondary motion generator in accordance with the invention providing more complex motions. Alternatively, the primary motion generator could provide movements in the X and Y directions and yaw degrees of freedom. One example of a known motion generator suitable for use as a primary motion generator, with a motion generator in accordance with the invention being a secondary motion generator, is that disclosed in US2017/0053548. In such a combination, a motion generator according to the invention is arranged as a secondary motion generator in which at least one rocker unit of that secondary motion generator is mounted on a frame, the end effector of, or as the payload of, the primary motion generator. For example, the primary motion generator may include a frame, or platform, as the end effector and at least one rocker motor arrangement of the secondary motion generator (a motion generator in accordance with the invention) may be pivotally mounted to the frame of the primary motion generator.

According to another aspect of the invention there is provided a motion system, the motion system comprising at least one motion generator according to the invention, and a control system. The control system may control the operation of at least one motion generator actuator (i.e., one of the curved linear motors), preferably that of all such actuators. The control system may compute the positions, accelerations and/or forces required to be produced at each curved linear motor in order to generate a demanded motion profile. The rocker of a motion generator or motion system may include a linear encoder, especially a curved linear encoder, which gives particularly high-resolution control, for example about 1 million counts per radian, in use, over the position of the rocker.

According to another aspect of the invention there is provided a driving or vehicle simulator including a motion generator according to the invention or a motion system according to the invention, and at least one environment simulation means selected from visual projection, or display means, and audio means. The driving or vehicle simulator may comprise a cockpit or chassis and/or vehicle simulation element as the payload of the motion generator. The driving or vehicle simulator may include means for simulating an environment comprising at least one of a display apparatus, virtual reality apparatus, projection apparatus, and software means for modelling a virtual environment, and a vehicle model.

Another aspect of the invention provides a method of producing a motion system comprising producing or providing a motion generator according to the invention and connecting a control system to the motion generator to produce a motion system.

Other features of the motion generators, motion systems, and driving simulators will be apparent from the description and further claims set out below. Where reference is made to apparatus such as motion generators, motion systems, motion simulators and certain aspects or embodiments of the invention, the skilled addressee will appreciate that other aspects and embodiments of the invention may equally apply to such apparatus.

BRIEF DESCRIPTION OF THE FIGURES

Motion generators, motion systems, and driving simulators and their operation and production in accordance with the invention will now be described, by way of example only, with reference to the accompanying drawings, FIGS. 1 to 14, in which:

FIG. 9A is a plan view, FIG. 9B is a rear elevation, FIG. 9C is a front elevation, FIG. 9D is a view from one side, and FIG. 9E is a view from the other side;

FIG. 10A is a plan view, FIG. 10B is a rear elevation, FIG. 10C is a front elevation, FIG. 10D is a view from one side, and FIG. 10E is a view from the other side;

FIG. 11A is a plan view, FIG. 11B is a rear elevation, FIG. 11C is a front elevation, FIG. 11D is a view from one side, and FIG. 11E is a view from the other side;

FIG. 12A is a plan view, FIG. 12B is a rear elevation, FIG. 12C is a front elevation, FIG. 12D is a view from one side, and FIG. 12E is a view from the other side;

DETAILED DESCRIPTION OF VARIOUS EMBODIMENTS

References in this specification to particular orientations and positions, such as upper or lower, refer to those orientations or positions as shown in the accompanying drawings.

A Motion Generator

Figure 1:
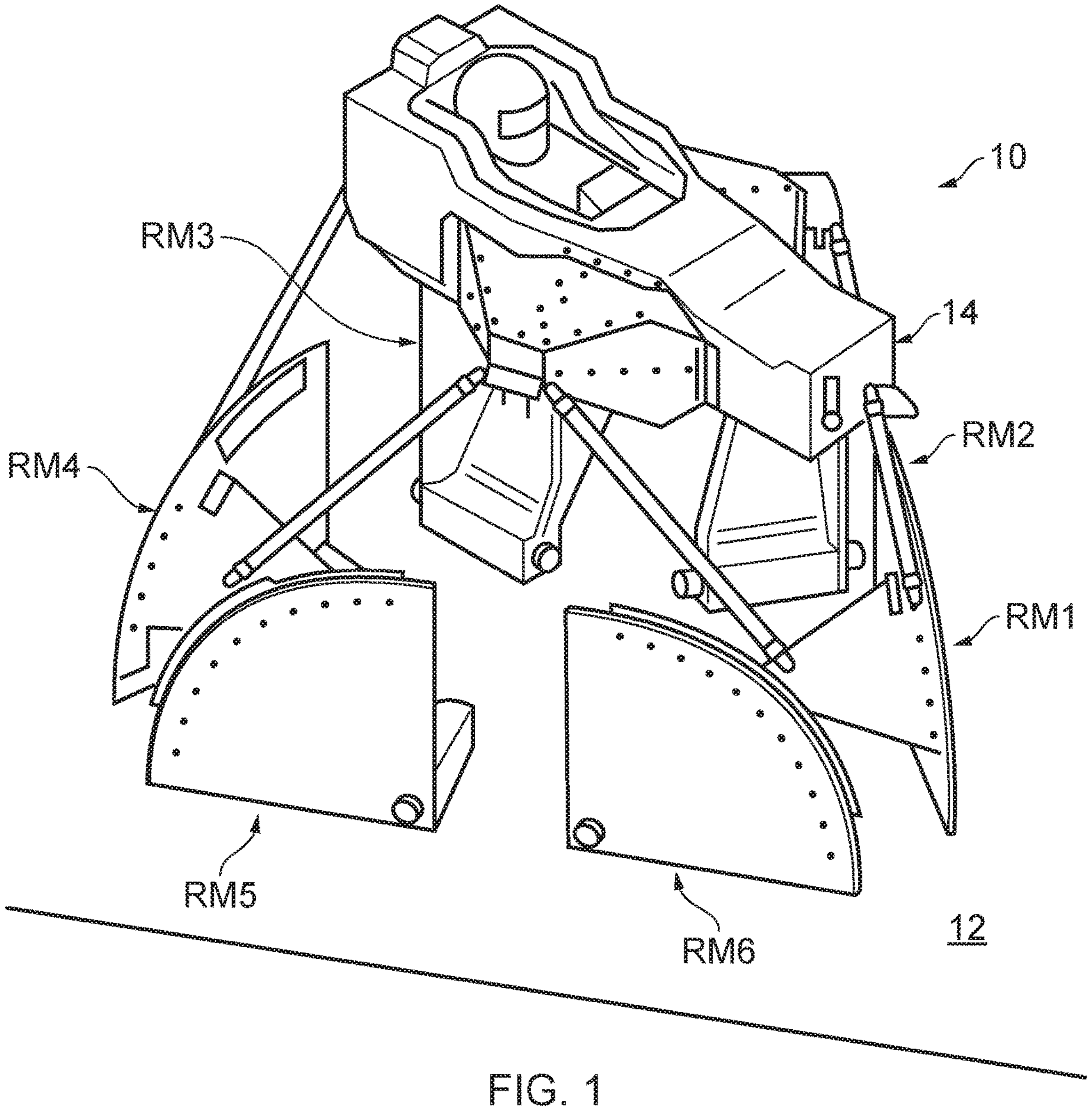
FIG. 1 is a schematic perspective view of a motion generator in accordance with the invention, from above and one side.

A motion generator 10 in accordance with the invention is shown in FIG. 1. The motion generator is arranged on a surface 12, which is typically the floor of a building in which the motion generator is located. Alternatively, the surface 12 could be provided by a base for the motion generator. The motion generator comprises six rocker motor arrangements RM1-6, each comprising a rocker R1-6 respectively, and an associated curved linear motor CLM1-6, respectively. In this embodiment, the curved linear motor is actually provided by a plurality of suitable motors such as the ACR335-5S motor per rocker. For example, there may be 6 motors per rocker. Each rocker R1-6 comprises a rocker body, or arm, RB1-6 respectively one end of which pivots around an associated rocker pivot axis RPA1-6 respectively. The other end of each rocker R1-6, being the free end of the rocker, is connected to one of a series of six generally upwardly extending elongate struts S1-6 by means of a lower universal joint LJ1-6. The other end of each elongate strut S1-6 is connected by means of an upper universal joint UJ1-6 respectively to an end effector 14 which is a racing car chassis including a cockpit. The struts S1-6 are connected in pairs to the effector 14.

Figure 2:
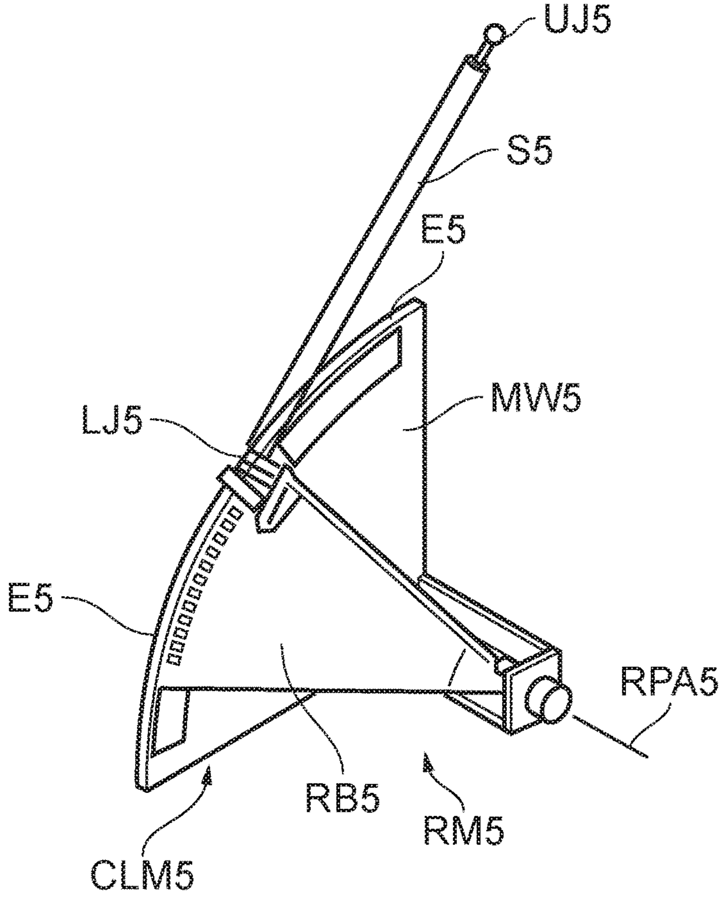
FIG. 2 is a perspective view of a rocker motor arrangement of the motion generator of FIG. 1.
Figure 3:
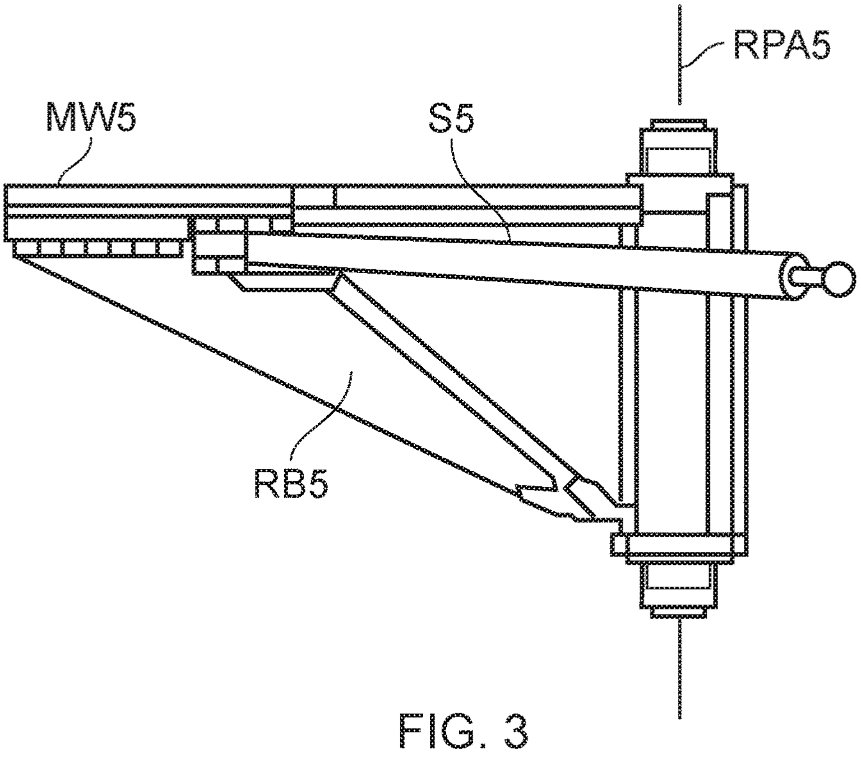
FIG. 3 is a plan view of the rocker motor arrangement of FIG. 2.
Figure 4:
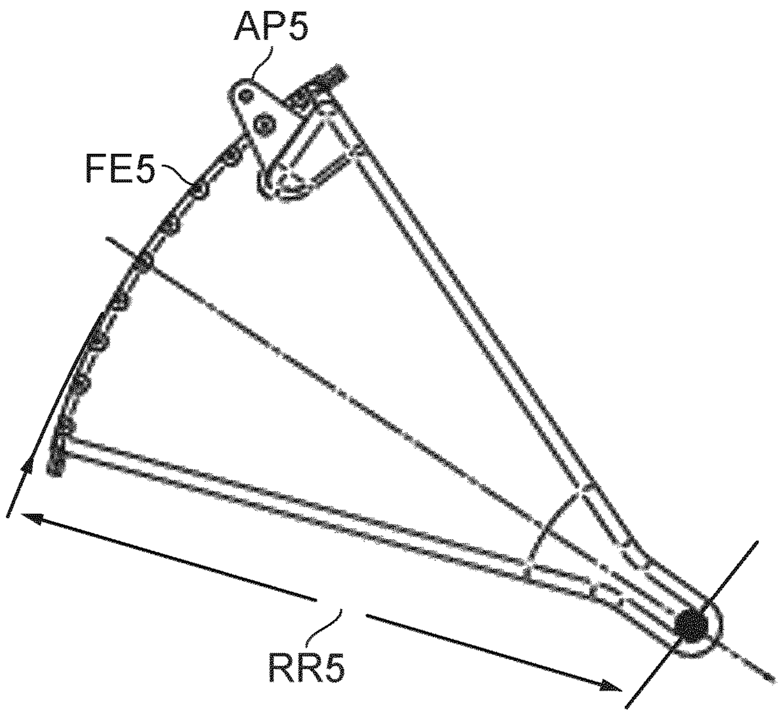
FIG. 4 is an elevation of the rocker of the rocker motor arrangement of FIG. 2.
Figure 5:
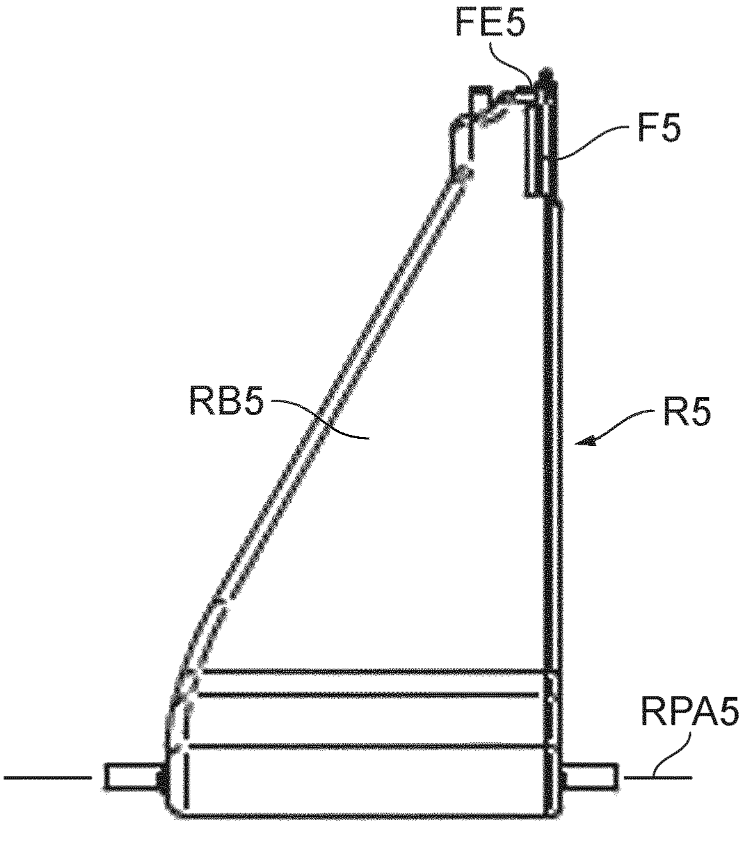
FIG. 5 is another elevation of the rocker of FIG. 4.
Figure 6:
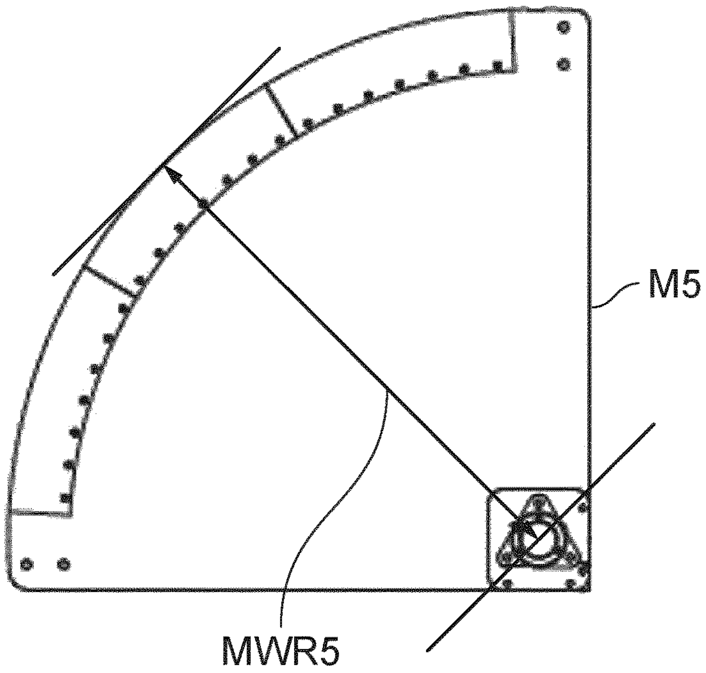
FIG. 6 is an elevation of the magnet way of the rocker motor arrangement of FIG. 2.
Figure 7:
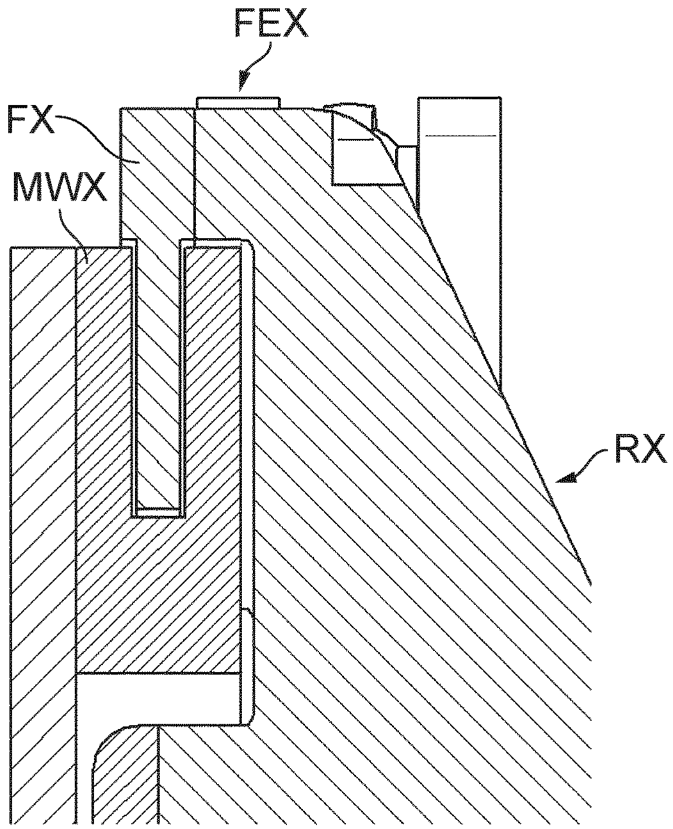
FIG. 7 is a detailed cross section through a rocker motor arrangement for use in a motion generator in accordance with the invention.

One of the rocker motor arrangements, RM5, is shown in more detail in FIGS. 2 to 6. In particular, FIG. 2 shows the curved magnet way MW5 (which is one of magnet ways MW1-6 of the rocker motor arrangements RM1-6). Magnet way MW5 has a curved outer edge E5 at which the electromagnets of the motor are arranged. The outer edge of the magnet way E5 has a radius of curvature which matches the free end FE5 of the rocker body RB5. A coil F5 for the curved linear motor CLM5 is arranged at or towards the free end FE5 of the rocker R5. In this case, the coil F5 is mounted at the free end FE5 of the rocker R5. FIG. 3 shows the rocker motor arrangement RM5 from above, illustrating the three-dimensional shape of the rocker body RB5. FIG. 4 shows the radius RR5 of the rocker R5, and the attachment point AP5 for the associated lower universal joint LJ5 at the free end FE5 of the rocker R5. The way that the curved coil F5 is mounted at or towards the curved free end FE5 of the rocker R5 is shown in FIG. 5. Similarly, FIG. 6 shows the outer curved edge of the magnet way MW5, and the radius of the magnet way MWR5. FIG. 7 shows a rocker motor arrangement RMX in which a rocker RX includes a curved coil FX at outer free end FEX, which is received within a curved magnet way MWX, with an air gap around the coil FX. It should be noted that the image of FIG. 7 also shows an Akribis-type curved linear motor magnet way in which the magnet way passes through a slot in the coil which wraps around the magnets. The images of FIGS. 1 to 6 represent the same type of motor, but this internal detail is not visible in those images.

The motion generator 10 is suitable for use in motion systems, in driving simulators, or in combinations of motion generators all in accordance with the invention.

Another Motion Generator

Figure 8:
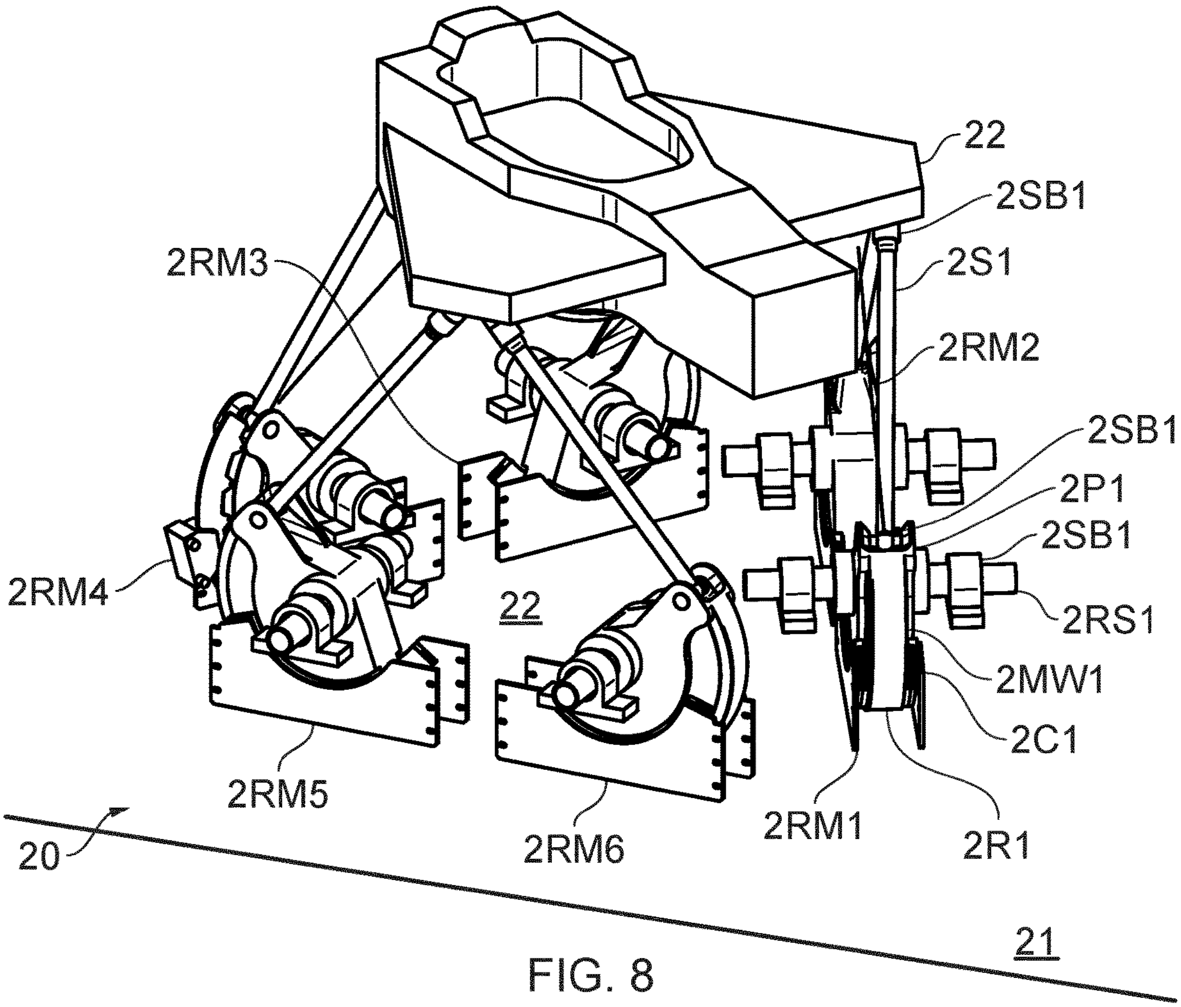
FIG. 8 is a perspective view of another motion generator in accordance with the invention, from above and one side in a neutral or nominal condition.
Figure 8A:
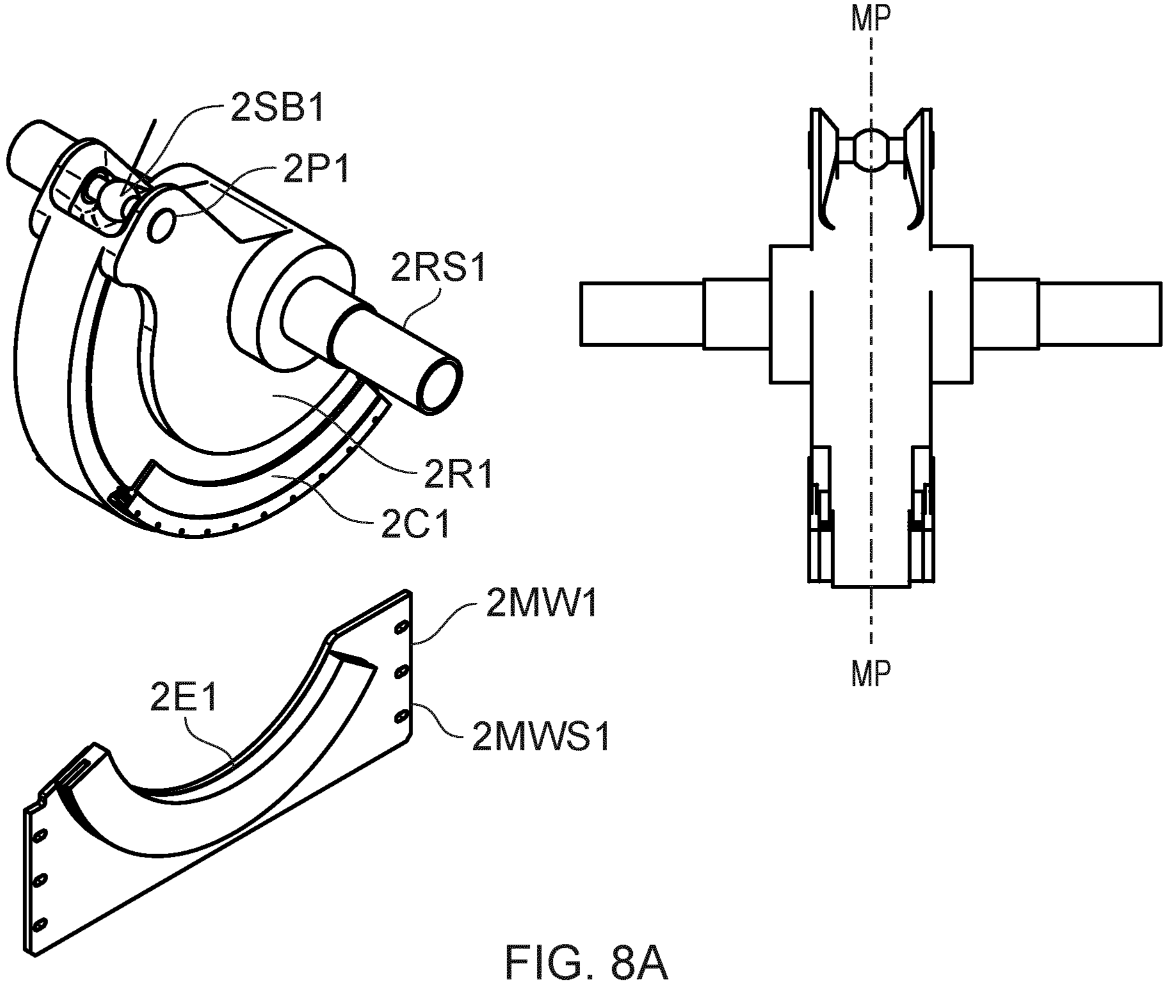
FIG. 8A is a perspective exploded detail view of components of a rocker unit of the motion generator of FIG. 8

Another motion generator is shown in FIG. 8 in a nominal condition, and in FIGS. 9-12A-E in various operating conditions. The motion generator 20 is arranged on a surface 21 which is typically the floor of a building in which the motion generator is located. Alternatively, the surface 21 could be provided by a base unit for the motion generator. The motion generator 20 comprises six modular rocker motor units 2RM1-6, each comprising a rocker 2R1-6 respectively, and an associated curved linear motor 2CLM1-6, respectively. As shown in FIG. 8A, the rockers 2R of each unit are symmetrical around their mid-plane MP. As the rockers of modular rocker units are generally identical, which means they are readily interchangeable in the motion generator, the main components of only one of the units, 2RM1 are identified. The corresponding components of the other units 2RM2-6 are essentially identical (except for the handedness of some components) and are not separately identified in FIG. 8. Each curved linear motor 2CLM is preferably an ironless motor. Each rocker 2R1-6 comprises a curved rocker body, 2RB1-6 respectively one end of which pivots around a pivot axis formed by a rocker shaft 2RS1-6 respectively. Either end of each rocker shaft 2RS is supported by shaft bearings 2SB. The other end of each rocker 2R1-6, being the free end of the rocker, is connected to one of a series of six generally upwardly extending elongate struts 2S1-6 by means of a lower Cardan joint 2LJ1-6. Alternatively, the joint 2LJ1-6 could also be a universal joint, spherical bearing or flexure or even a simple rod end. The joint 2LJ1-6 connects to a pin 2P1-6 carried by the rocker 2R1-6 and an associated spherical bearing 2SB1-6 The spherical bearing 2SB1-6 could be replaced by a universal joint, spherical bearing or flexure. The other end of each elongate strut 2S1-6 is connected by means of an upper Cardan joint 2UJ1-6. Alternatively, 2UJ1-6 could be a universal joint spherical bearing or flexure connected respectively to an end effector or effector payload in the form of a racing car chassis 22 including a cockpit. The struts 2S1-6 are connected in pairs to the chassis 22.

Components of one of the modular rocker motor units, 2RM1 are shown in more detail in FIGS. 8A and B. FIG. 8A shows the curved magnet way 2MW1. Magnet way 2MW1 has a curved outer edge 2E1 at which the magnets of the motor are arranged. The outer edge 2E2 of the magnet way 2MW1 has a radius of curvature which matches that of the associated rocker body 2RB1. The magnet way 2MW1 is supported on magnet way support 2MWS. A coil (or "forcer") 2C1 of the curved linear motor 2CLM1 is arranged at the curved free end FE5 of the rocker R5. In this embodiment, each curved linear motor 2CLM, i.e., the magnet way 2MW and coil 2C are underslung below the corresponding rocker shaft 2RS and in a general "swing boat" arrangement. This arrangement is dynamically advantageous. The arrangement is also spatially advantageous in that it avoids clashes between the motors and the struts and chassis above. It will also be noted that the shaft bearings 2RB are relatively high in this embodiment (i.e., when compared with the low rocker bearings of the embodiment of FIG. 1) being spaced above the associated magnet way. This arrangement of high shaft bearings above the rockers is also dynamically advantageous. The modularity of the rocker units s is also highly advantageous in that rocker unts may be readily substituted.

Figure 8B:
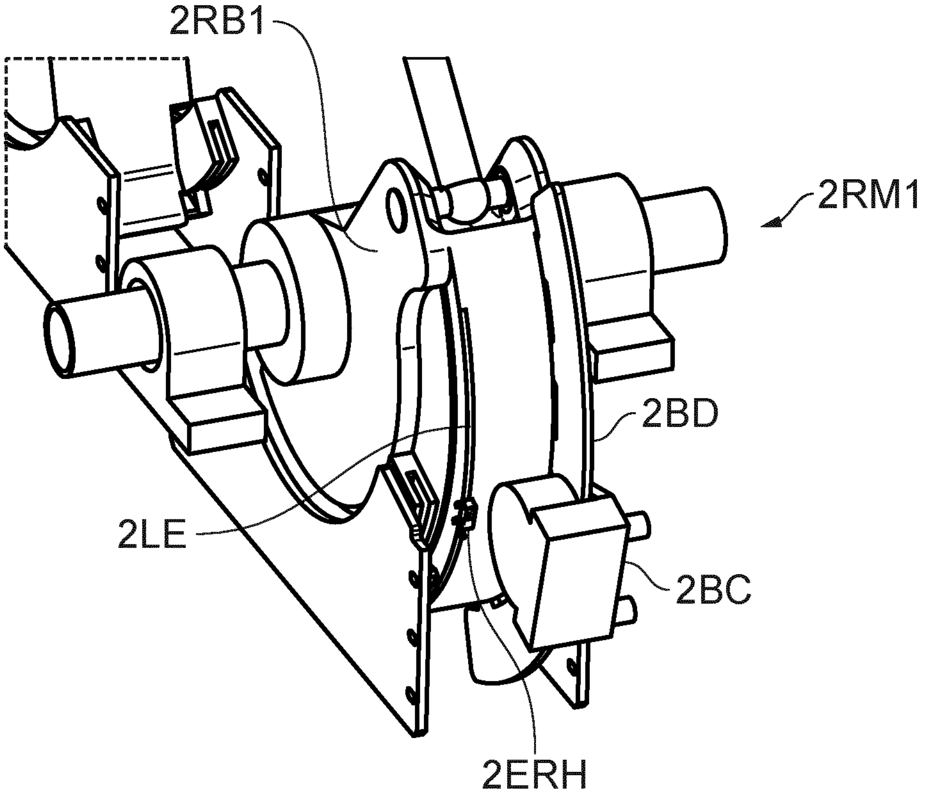
FIG. 8B is a further detail view of components of a rocker unit of the motion generator of FIG. 8 particularly showing brake and encoder components.
Figure 9:
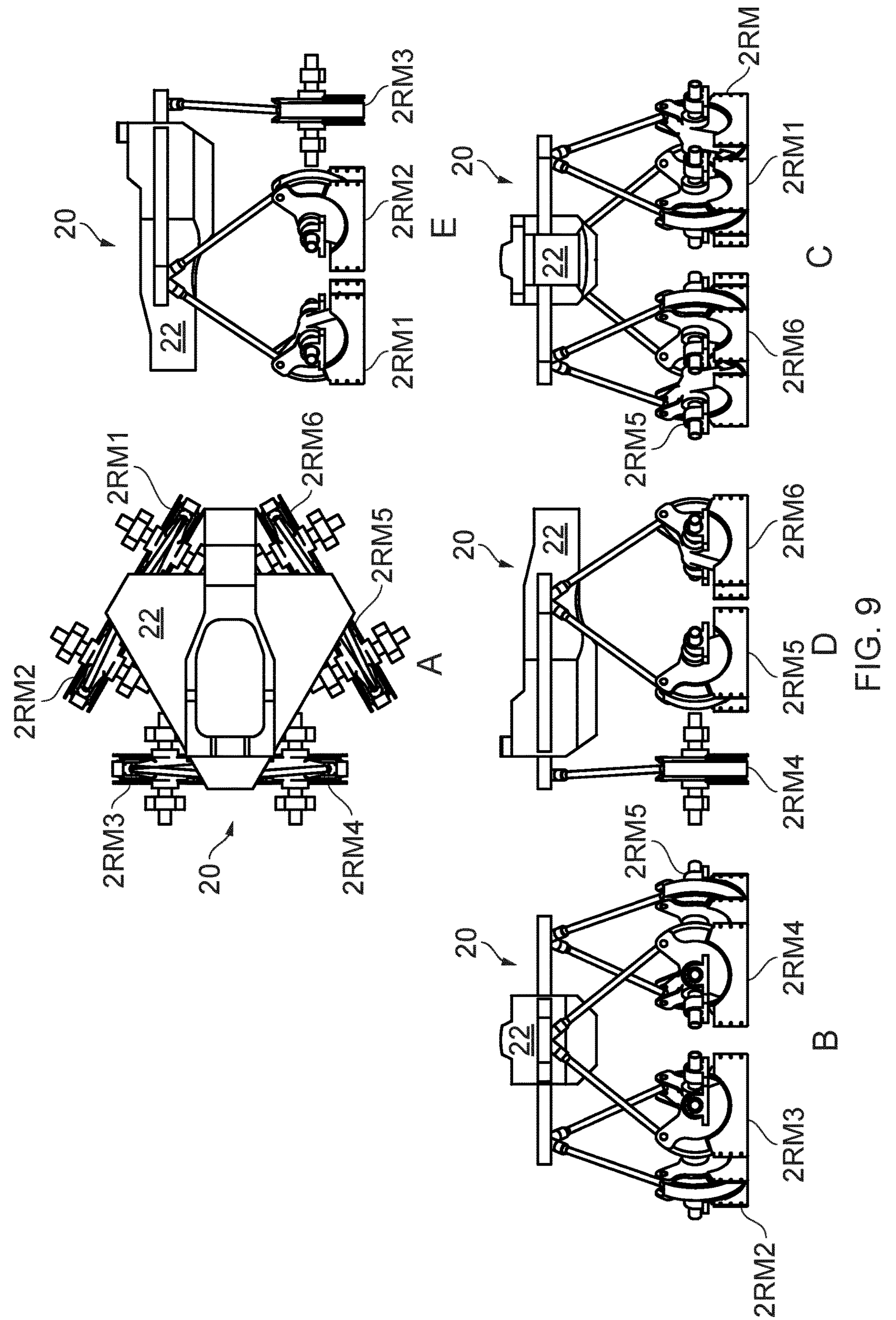
FIGS. 9A-E show the motion generator of FIG. 8 in a neutral or nominal condition from different aspects, specifically
Figure 10:
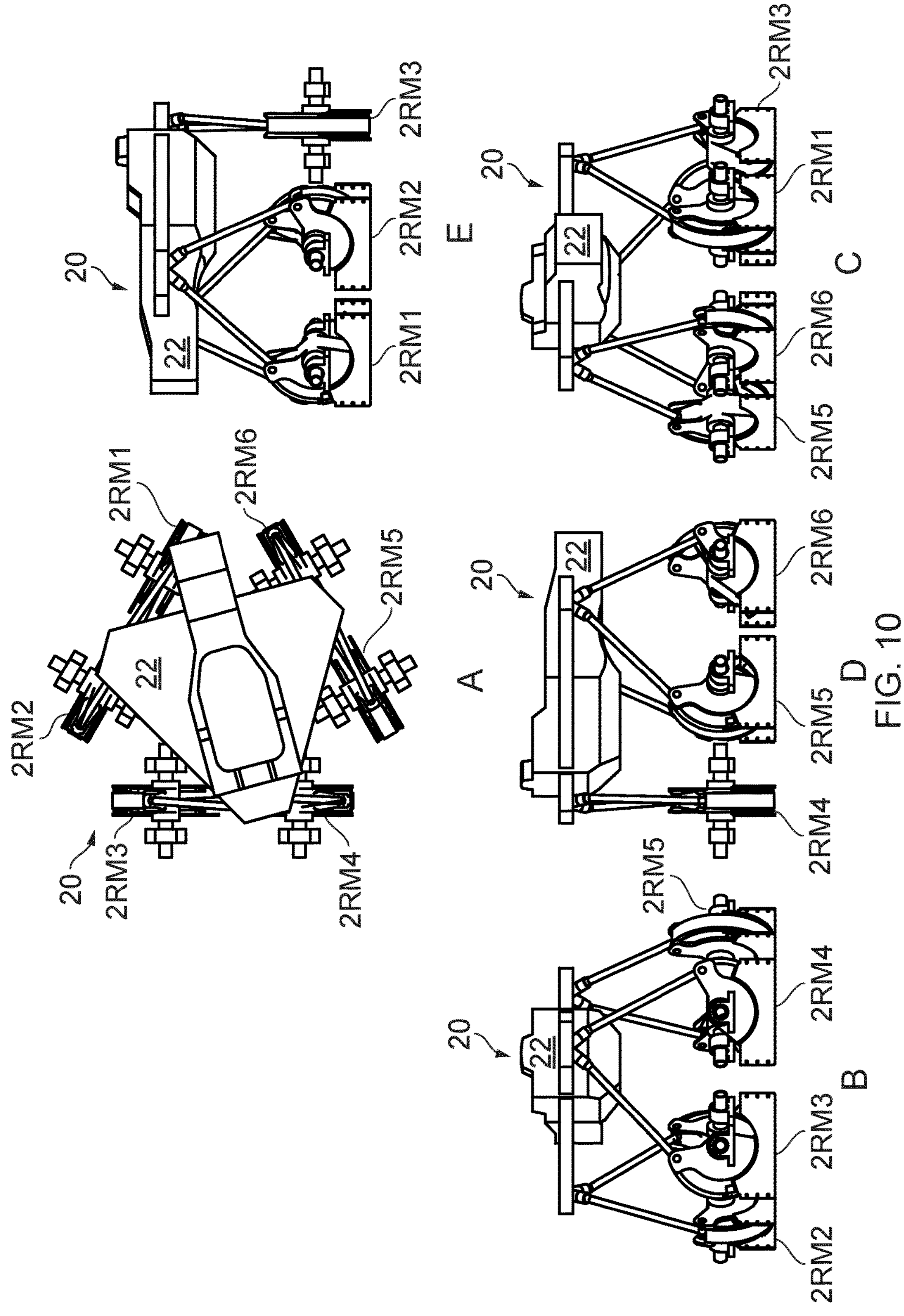
FIGS. 10A-E show the motion generator of FIG. 8 in a yaw condition from different aspects specifically
Figure 11:
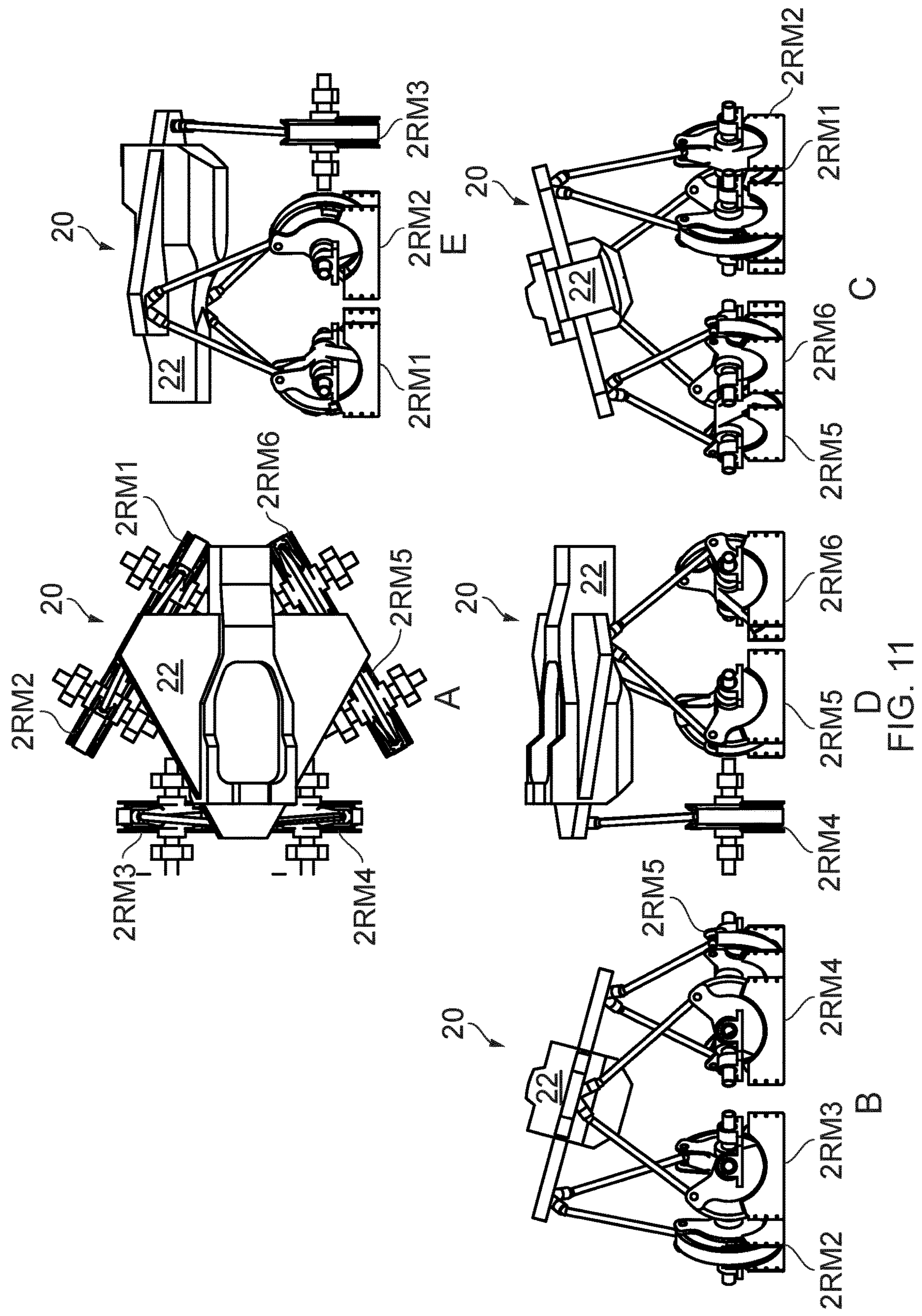
FIGS. 11A-E show the motion generator of FIG. 8 in a roll condition from different aspects specifically
Figure 12:
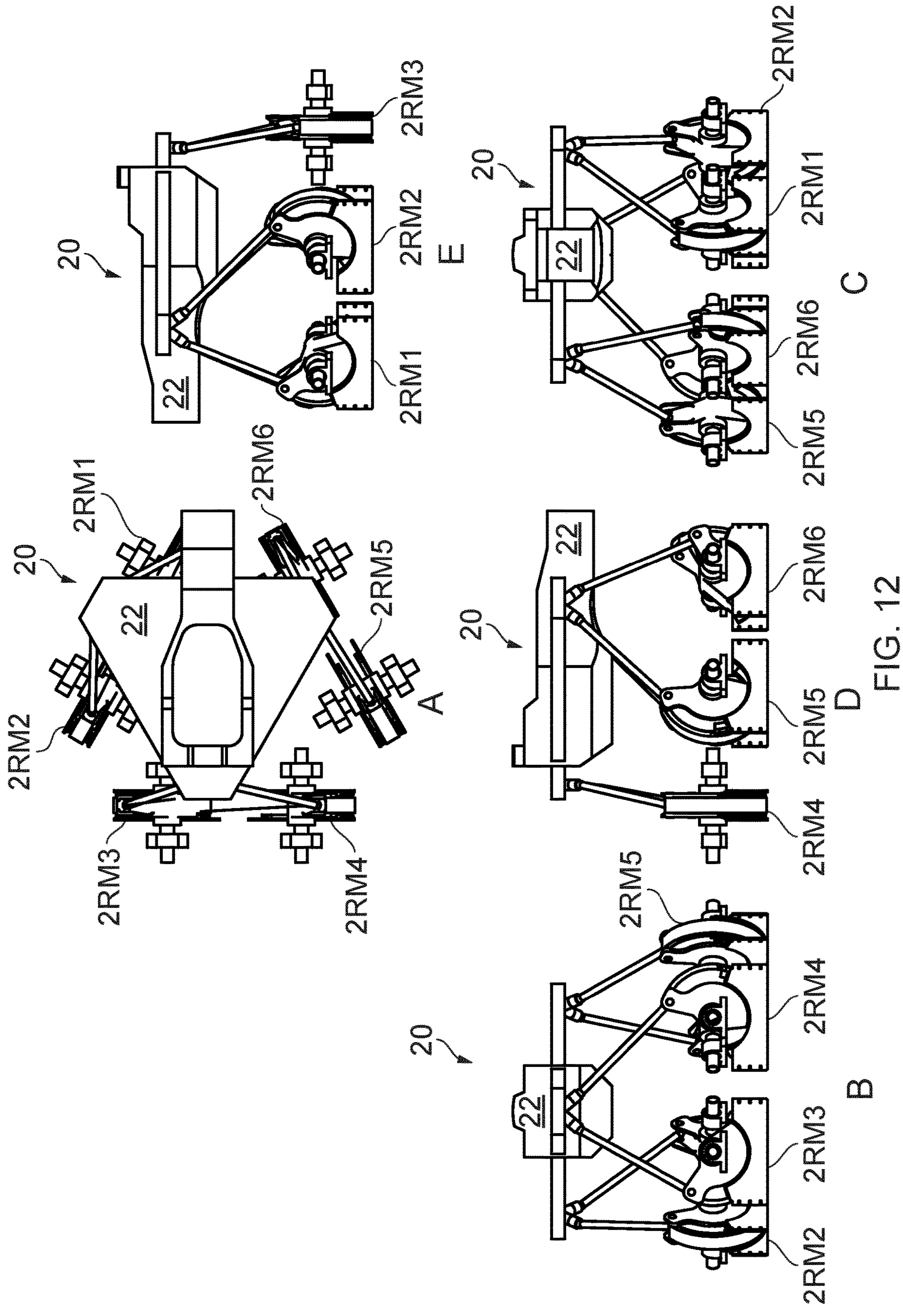
FIGS. 12A-E show in a combined surge and sway condition from different aspects specifically

FIG. 8B shows a disc brake unit of the modular rocker unit 2RM1. The disc brake unit comprises a brake calliper 2BC and a brake disc 2BD which is fixed in relation to the rocker body 2RB1. The disc brake unit can be operated as required under the control of a control system to assist in control of the rocker body's position. Additionally, a curved linear encoder 2LE tape is mounted on the rocker 2RB1 and operates in conjunction with an encoder read head 2ERH to determine the rocker body's position with very high resolution for example about 1 million counts per radian. This further enhances the control over the position of a rocker in use which in turn supports very high bandwidth motion of the effector.

The motion generator 20 is also suitable for use in motion systems, in driving simulators, or in combinations of motion generators in accordance with the invention.

Operation of a Motion System

In operation a motion generator in accordance with the invention such as motion generator 10 or 20 is operated by means of an associated control system (not shown but, for example, as generally described in WO2020/228992) which forms a motion system together with the motion generator. The control system operates with a simulation environment, such as a driving simulation in which the physics of a simulated vehicle and its environment, such as a racetrack or city roads, are computed. For example, the driving simulation may be in the context of a driving simulator in accordance with the invention as described below. In such an embodiment the control system receives motion demands from the simulation environment, which represent the motion of a virtual vehicle. The computer program determines the motion of the vehicle in a virtual world, then applies a motion cueing algorithm (MCA, also known as washout filters) to transform the simulated vehicle motions into those that can be represented by the motion generator. These calculated motions are then provided to the control system as motion demands. The MCA could be part of the simulation environment or the control system or separate to both. The simulation environment may receive inputs signals from control devices such as steering, throttle or brake inputs, which an operator, i.e., a human user such as a driver, passenger or pilot uses to control the virtual vehicle in the simulation environment. The operator would likely be a passenger (driver) in a chassis as payload on the motion generator (e.g., motion generator 10 or 20 in the example embodiments). These inputs may be passed back to the simulation environment via the control system or directly. The simulation environment is also likely to produce an output on a visual display for the driver, passenger, or other user or operator. The simulation environment may also require additional data from the control system, such as relating to the position of the motion generator, or control device inputs signals.

The motion generator can be operated to move the end effector such as chassis 14 or 22 from the nominal condition described above through various motions or conditions, such as roll, pitch, yaw, sway right or left, heave up, heave down, surge forward and may be operated into multiple combinations of such conditions For example, the motion generator may be operated into a combined heave up and yaw nose left condition. Examples of such motions or conditions, and the corresponding effector, rocker, and strut positions are shown in FIGS. 9A-E to FIGS. 12A-E for the motion generator 20 of FIG. 8.

A motion generator of the invention operated in these ways has the advantages including high bandwidth, low friction, and low inertia which increase the accuracy/positioning of the movements of the payload/end effector and low latency.

Combination of Motion Generators

Figure 13:
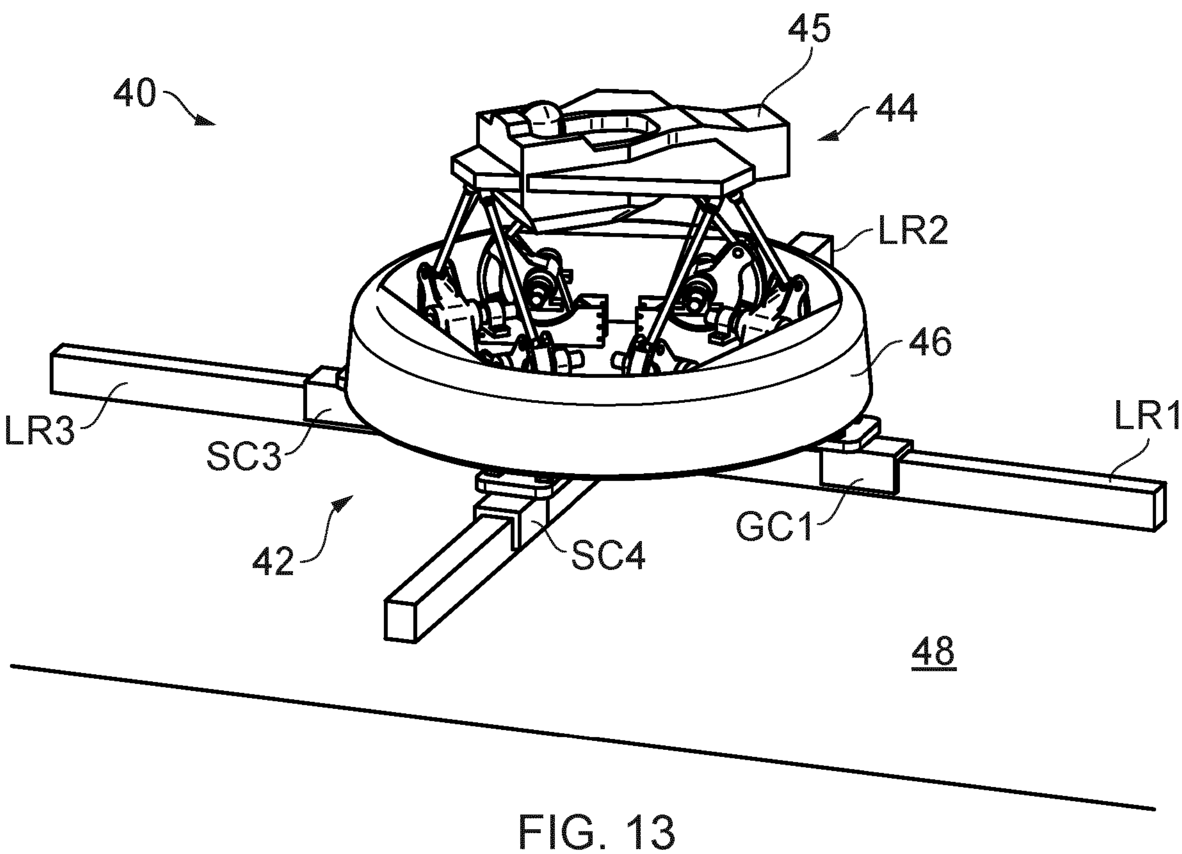
FIG. 13 is a perspective view of a combination of a motion generator in accordance with the invention as a secondary motion generator in the combination, together with another motion generator as a primary motion generator in the combination from above and one side.

As mentioned above, a motion generator in accordance with the invention may be used in series with a further motion generator. For example, a motion generator in accordance with the invention may be used as a secondary motion generator in a combination, that is to say the motion generator itself becomes the payload of a primary motion generator. The combination is advantageous in that the primary motion generator may be relatively inexpensive but provides good excursion ranges in the X and Y directions and the secondary motion generator provides a higher bandwidth, and positional accuracy and lower levels of inertia and friction which further increase the accuracy of the movements imparted to the payload. Such a combination, or "two-stage" motion generator, is shown in FIG. 13. FIG. 13 shows a two-stage motion generator 40 which comprises a first stage low frequency motion generator 42 on which is mounted a second stage high frequency motion generator 44 supporting an effector payload—chassis 45. The first stage motion generator 42 is arranged to provide motion in three degrees of freedom and comprises a rotatable platform 46 which is arranged to rotate about a vertical axis and can move through 360 degrees or more about that axis. The rotatable platform 46 moves in the X and Y directions on guide carriages GC1-4 which are powered to move along linear rails LR1-4 above a surface 48 (typically the floor of a simulator room). The rotatable platform 46 provides a surface on which is mounted the second stage motion generator and provides movement to the second stage motion generator in the X and Y directions as well as yaw. The second stage motion generator 44 is a motion generator of the invention. For example, motion generator 10 or 20 as described above and provides high bandwidth movement to its effector payload—chassis 45.

Driving Simulator

Figure 14:
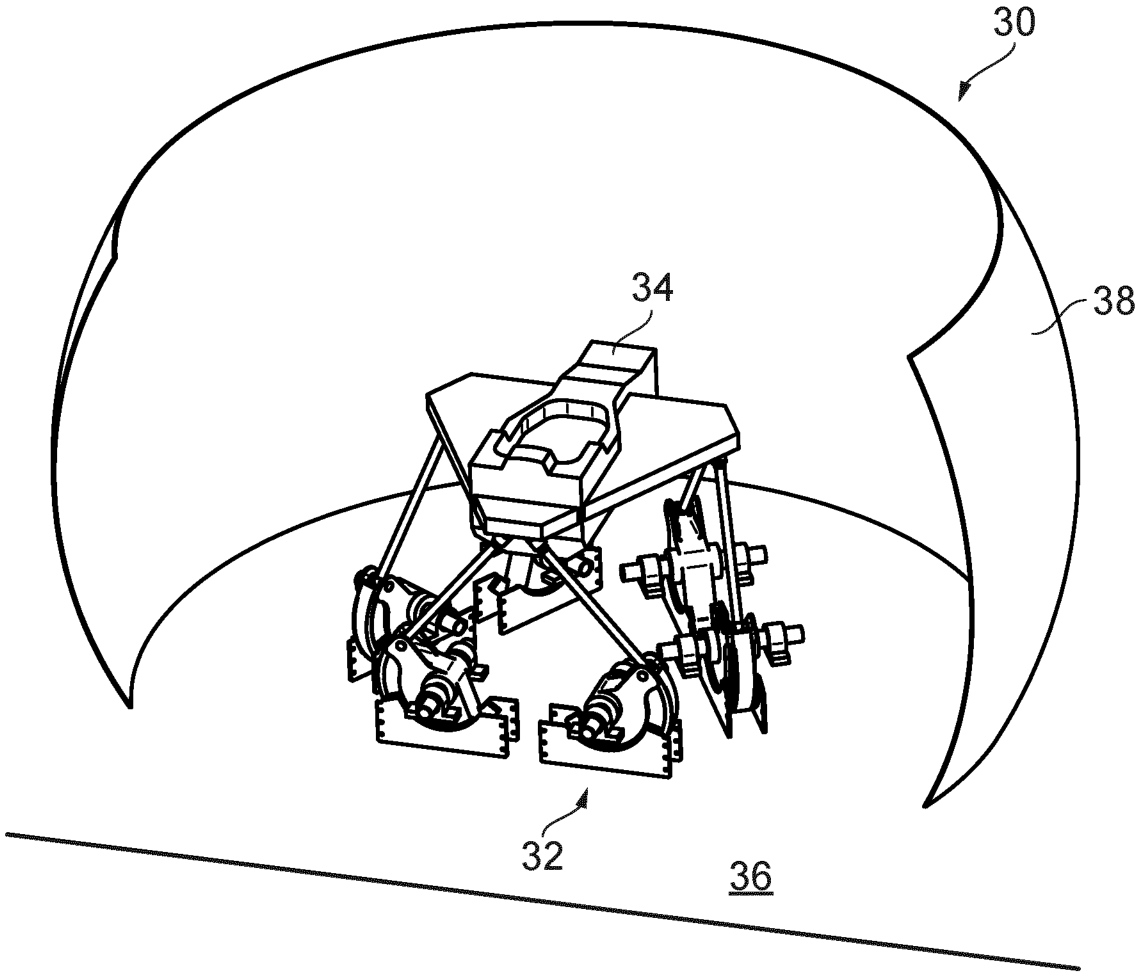
FIG. 14 is a perspective view of a driving simulator in accordance with the invention.

A driving simulator 30 in accordance with the invention is shown in FIG. 14. The driving simulator 30 comprises a motion system 32 including a motion generator in accordance with the invention, for example a motion generator as described above in relation to FIGS. 1 to 7, or a motion generator as described above in relation to FIGS. 8 and 9 to 12 A-E, or a combination including a motion generator of the invention as described above for example in relation to FIG. 13, and a control system (not shown but for example as generally described in WO2020/228992). The motion generator has a chassis 34 as an effector payload. The motion system is mounted on a surface 36 in front of a projection system 38 on which can be displayed images of a driving environment (the projection system constitutes an example of an environment simulation means). An audio system (not shown) provides sound to the user replicating the sounds of a driving environment, constituting another example of an environment simulation means. The motion generator of the driving simulator 30 is operated under the command of the control system (for example, as described above).

A motion generator in accordance with the invention, as described in the above embodiments may be advantageous when used in a driving simulator in some or all of several respects compared with known motion generators for such applications. A driving simulator incorporating a motion generator in accordance with the invention has low latency, avoiding or minimising the need for latency correction needed in other driving simulators especially significantly more expensive driving simulators.

Methods of Producing Motion Systems

A motion system in accordance with the invention including a motion generator, such as those described above, and control means may be assembled from custom and standard components for example as described above by conventional means. In particular, a motion system may be produced by connecting a motion generator in accordance with the invention with a control system as described above. It will be noted that the rocker units are preferably modular in that one rocker unit may be replaced by another such unit in any position in the motion generator.

The invention claimed is:

1. A motion generator for simulating driving or flying, the motion generator comprising:

an effector for receiving a vehicle chassis or cockpit, wherein the motion generator is arranged to apply movement to the effector relative to a surface;

a plurality of rockers each including a free end that is operably connected to the effector via a strut, wherein each rocker is pivotable about a pivot axis, such that movement of the rockers about the respective pivot axis leads to movement of the effector;

a plurality of curved ironless linear motors, wherein each one of the plurality of curved ironless linear motors is arranged to drive a corresponding one of the plurality of rockers along a path that is concentric with an arc swept by the free end of the corresponding one of the plurality of rockers, and wherein each of the plurality of rockers includes one of:

a coil positioned adjacent the free end, or one or more electromagnets of a respective one of the plurality of curved ironless linear motors, the one or more electromagnets arranged adjacent the free end.

2. The motion generator according to claim 1, in which the said at least one rocker carries or comprises the coil of the associated curved ironless linear motor.

3. The motion generator according to claim 1, in which at least one of the coil or electromagnets of a given one of the plurality of curved ironless linear motors, as the case may be, is arranged substantially or wholly below the pivot axis of an associated one of the plurality of rockers.

4. The motion generator according to claim 3, in which a bearing for an associated shaft forming the pivot axis for a given one of the plurality of rockers, is above the corresponding coil or electromagnets, as the case may be, of an associated one of the curved ironless linear motors.

5. The motion generator according to claim 1, in which each one of the plurality of rockers is of composite, plastics, or metal, preferably aluminum, construction.

6. The motion generator according to claim 1, in which the pivot axis of each one of the plurality of rockers is parallel with the surface.

7. The motion generator according to claim 1, comprising four or more elongate rigid struts.

8. The motion generator according to claim 7, in which there are six elongate rigid struts arranged in three pairs, each of the elongate rigid struts having a first end and a second end, each of the elongate rigid struts being connected at the respective first end with an associated one of the plurality of rockers, and the respective second ends of each pair of struts connecting to a respective one of three mounting points or joints on or connected to the effector.

9. The motion generator according to claim 1, in which each of the plurality of rockers is connected by intermediate first and second joints to the effector.

10. The motion generator according to claim 9, in which each of the intermediate first and second joints includes one of:

a universal joint, swivel, or flexure;

a Cardan joint, swivel, or flexure; or a spherical joint, swivel, or flexure.

11. The motion generator according to claim 1, in which each of the plurality of rockers is symmetrical about its midplane.

12. The motion generator according to claim 9, in which each of the intermediate first and second joints includes a Cardan joint with offset axes of rotation, while the other joint is a Cardan joint with offset axes of rotation.

13. A combination comprising a primary motion generator and a secondary motion generator arranged to operate together, in which the primary motion generator or the secondary motion generator in the combination is the motion generator according to claim 1.

14. The combination according to claim 13, in which the secondary motion generator is arranged to operate at a higher frequency than the primary motion generator of the combination.

15. A motion system including at least one motion generator according to claim 1, and a control system.

16. The motion system of claim 15, including at least one secondary motion generator arranged to operate together with the at least one motion generator.

17. A driving simulator including the motion generator of claim 1, and at least one environment simulation means selected from visual projection or display means, and audio means.

18. The driving simulator of claim 17, including one or both of:

a secondary motion generator arranged to operate together with the first motion generator; and a control system.

19. A method of producing a motion generator according to claim 1, the method comprising:

providing an effector for receiving a vehicle chassis or cockpit, a plurality of rockers each including a free end, a plurality of elongate rigid struts each having a first end and a second end, and a plurality of curved ironless linear motors each comprising a coil and one or more electromagnets, connecting the effector to the plurality of elongate rigid struts, including operably connecting the first end of each strut by a first joint to the effector, connecting the second end of each strut by a second joint to a respective one of the plurality of rockers, arranging each rocker of the plurality of rockers to be pivotable about a respective pivot axis, such that movement of the plurality of rockers about the respective pivot axes leads to movement of the effector, arranging each one of the plurality of curved ironless linear motors to drive a corresponding one of the plurality of rockers along a path that is concentric with an arc swept by the free end of the corresponding one of the plurality of rockers, and one of:

positioning the coil of each curved ironless linear motor on a respective one of the plurality of rockers, adjacent to the free end thereof; or arranging the one or more electromagnets on a respective one of the plurality of rockers, adjacent to the free end thereof.

* * * * *